United States Patent [19]

Giachetti

[11] Patent Number: 4,541,522
[45] Date of Patent: Sep. 17, 1985

[54] APPARATUS FOR LOADING AND REPLACING PIECE GOODS, CAPABLE OF BEING COUPLED TO SPREADING MACHINES

[76] Inventor: Franco Giachetti, Via Gardale, 25036 Palazzolo sull'Oglio (Brescia), Italy

[21] Appl. No.: 386,939

[22] Filed: Jun. 10, 1982

[51] Int. Cl.[4] .................... B65G 37/00; B65G 17/32
[52] U.S. Cl. ................................. 198/465.1; 198/681
[58] Field of Search .............. 198/473, 681, 797, 472, 198/631, 586, 580

[56] References Cited

U.S. PATENT DOCUMENTS

| 322,871 | 7/1885 | Waldron | 198/473 |
|---|---|---|---|
| 1,921,577 | 8/1933 | Nelson | 198/580 |
| 1,967,213 | 7/1934 | Beplate | 198/473 |
| 2,888,126 | 5/1959 | Leaman et al. | 198/797 |
| 4,176,601 | 12/1979 | Szarka | 198/473 |
| 4,349,097 | 9/1982 | Curti | 198/586 |

FOREIGN PATENT DOCUMENTS

| 65679 | 9/1975 | Australia | 198/681 |
|---|---|---|---|
| 65821 | 5/1979 | Japan | 198/631 |

*Primary Examiner*—Joseph E. Valenza
*Assistant Examiner*—Daniel R. Alexander
*Attorney, Agent, or Firm*—Bucknam and Archer

[57] ABSTRACT

The apparatus comprises a vertically extending magazine, of the carousel type, bearing the piece goods to be supplied which are supported on suitable mandrels, and which piece goods are discharged, according to a programmable sequence, on a provided loading device.

The latter comprises a first carriage pair which, by firmly engaging the ends of the piece bearing mandrels, transfer the piece goods, in a co-ordinated way, from the mentioned magazine to the spreading machine turret.

A second carriage pair, on the other hand, is operative to displace the mandrels discharged by the spreading machine to the vertical magazine.

The apparatus according to the invention, in particular, is capable of locating, selecting and preparing the piece good on the vertical magazine, for loading the piece good on the spreading machine and, moreover, it is capable of loading the piece good and discharging the mandrel from the spreading machine, according to the order in which the piece good has been previously loaded on the vertically extending magazine.

5 Claims, 7 Drawing Figures

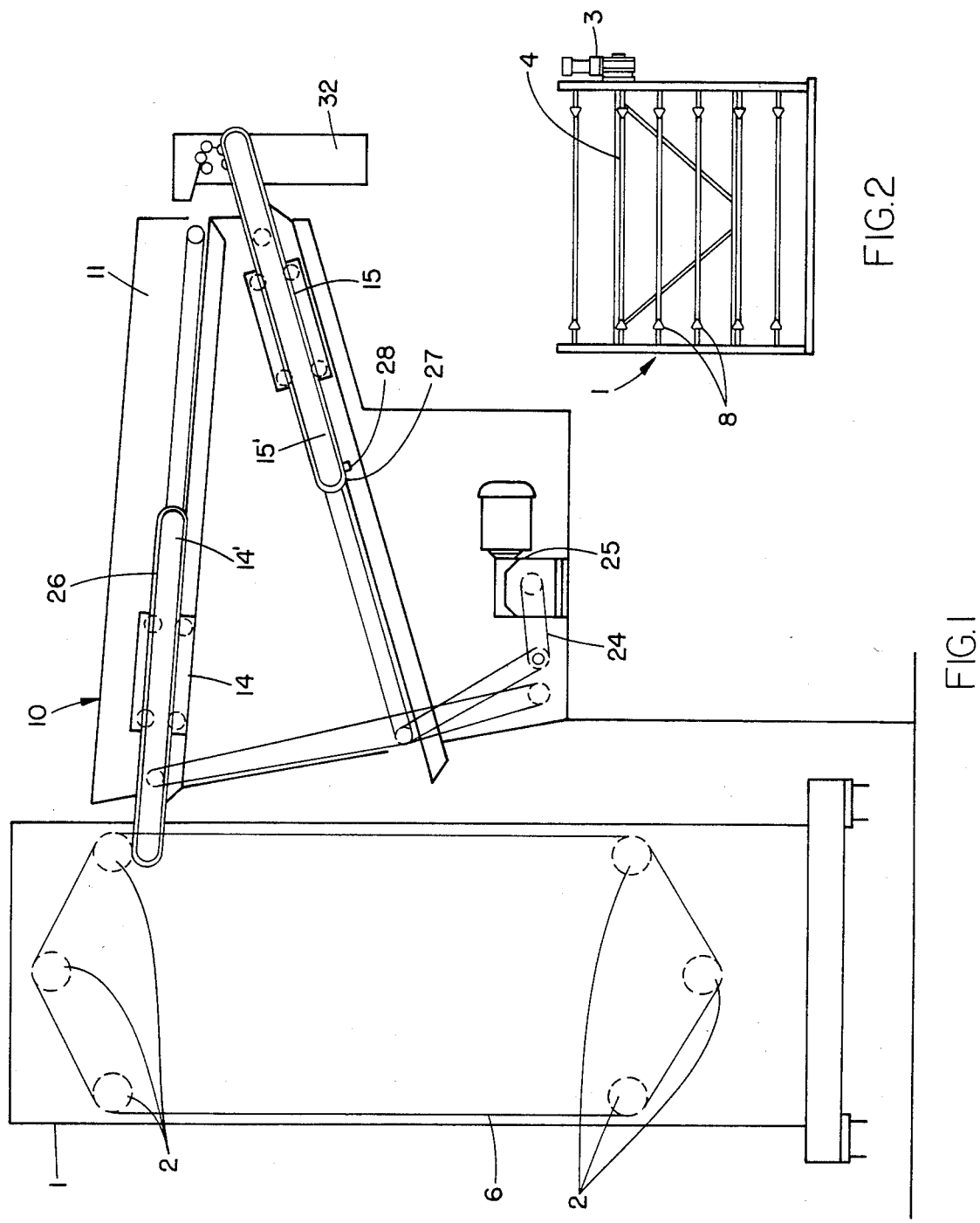

APPARATUS FOR LOADING AND REPLACING PIECE GOODS, CAPABLE OF BEING COUPLED TO SPREADING MACHINES

BACKGROUND OF THE INVENTION

The present invention relates to an apparatus for loading and replacing piece goods, or fabric pieces, capable of being associated with spreading machines of the type used in the clothing field.

It is known, in the clothing industry the fabrics are spread, before the cutting, in superimposed layers, in such a way as to form the so-called mattress.

In order to carry out this preliminary operation, suitable spreading machines are presently used, comprising an equipped turret capable of longitudinally sliding along a table and bearing the piece to be spread.

Presently the replacement of the piece goods which are present on the movable turret is carried out manually and requires several tedious operations, and long periods of operation thereby so that the cost of manufacture of the fabric articles is affected.

While recently devices have been constructed for semiautomatically carrying out the operations of replacement of the pieces, these devices, on the other hand, are not fully satisfactory.

SUMMARY OF THE INVENTION

Accordingly, one object of the present invention is to overcome the hereinabove mentioned drawbacks by providing an apparatus for loading and replacing piece goods capable of being associated with spreading machines, and capable of carrying out the loading of the pieces and replacement operations in a fully automatic manner, that is without any manual processings.

More specifically, a main object of the present invention is to provide an apparatus for loading and replacing piece goods capable of being associated with piece spreading machines, which apparatus is capable of locating, selecting and preparing the piece to be loaded on the spreading machine, while the latter is in operation.

Yet another object of the present invention is to provide an apparatus for loading and replacing piece goods which is capable of discharging the empty mandrel from the spreading machine and load a new piece according to a predetermined program.

Yet another object of the present invention is to provide an apparatus for loading and replacing piece goods which is capable of being associated with any spreading machine presently available.

According to one aspect of the present invention, the objects mentioned hereinabove, as well as yet other objects which will become more apparent hereinafter, are achieved by an apparatus for loading and replacing piece goods, capable of being associated with spreading machines, characterized in that it comprises a vertically extending rotating magazine or carousel provided with balance supporting members, capable of supporting the individual pieces to be spread, which carousel is located on a side of a loading device. The carousel includes two shoulders, the shoulders bearing two motorized carriage pairs driven with synchronized reciprocating movements along respective converging paths, the carriages bearing an arm member on the periphery of which a chain is capable of sliding, the chain being provided with two adjoining projecting small plates for receiving therebetween either the mandrel of the pieces to be loaded on the spreading machine or the mandrel to be discharged on the carousel.

Advantageously the movements of the piece bearing carousel and of the carriages are controlled by programming means capable of presetting the movements of the piece goods to be supplied, by causing one carriage to reach its related balance supporting member while the second carriage supplies another piece to the spreading machine.

Moreover, after having located the piece on that carriage, the carousel is driven in such a way as to load again the first carriage.

BRIEF DESCRIPTION OF THE DRAWINGS

Further characteristics and advantages of the apparatus for loading and replacing piece goods capable of being associated with piece spreading machines, according to the present invention, will become more apparent hereinafter from the following detailed description of a preferred embodiment which is illustrated, by way of an example, in the accompanying drawings, where:

FIG. 1 is a schematic view of the apparatus according to the present invention, showing one of the two shoulders of the carousel and the piece loading device;

FIG. 2 is a front view of the carousel;

DESCRIPTION OF THE PREFERRED EMBODIMENT

Figure 3:
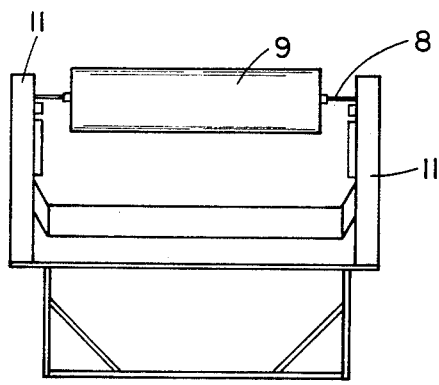
FIG. 3 is a front view of the piece loading device.
Figure 5:
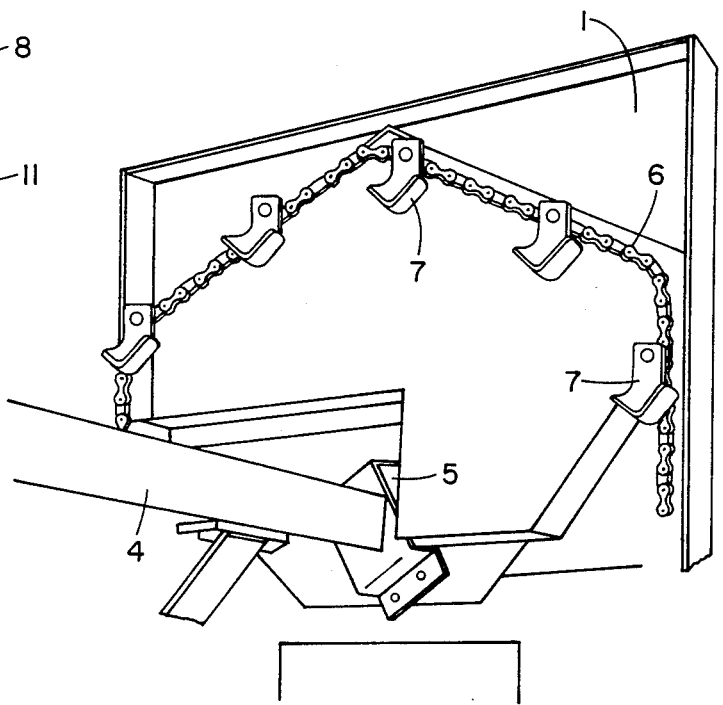
FIG. 5 is a detailed view of the carousel.
Figure 4:
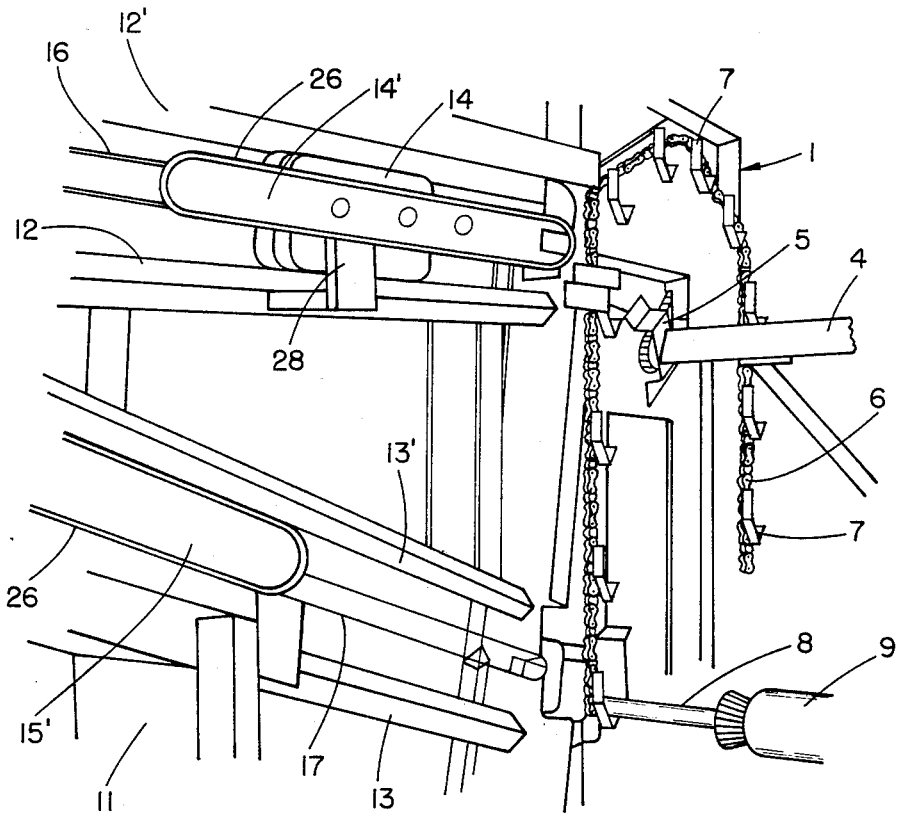
FIG. 4 is a partial perspective view of one shoulder of the same carousel and piece loading device.
Figure 6:
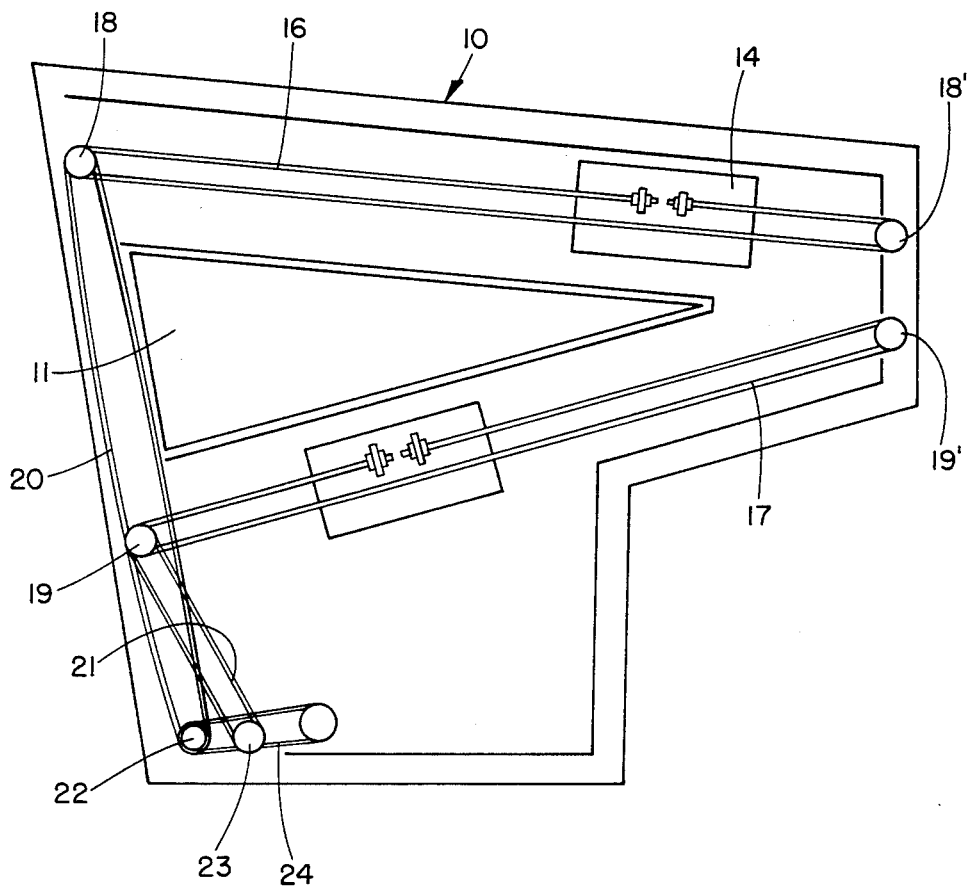
FIG. 6 illustrates the driving gears for driving one of the shoulders of the piece loading device.
Figure 7:
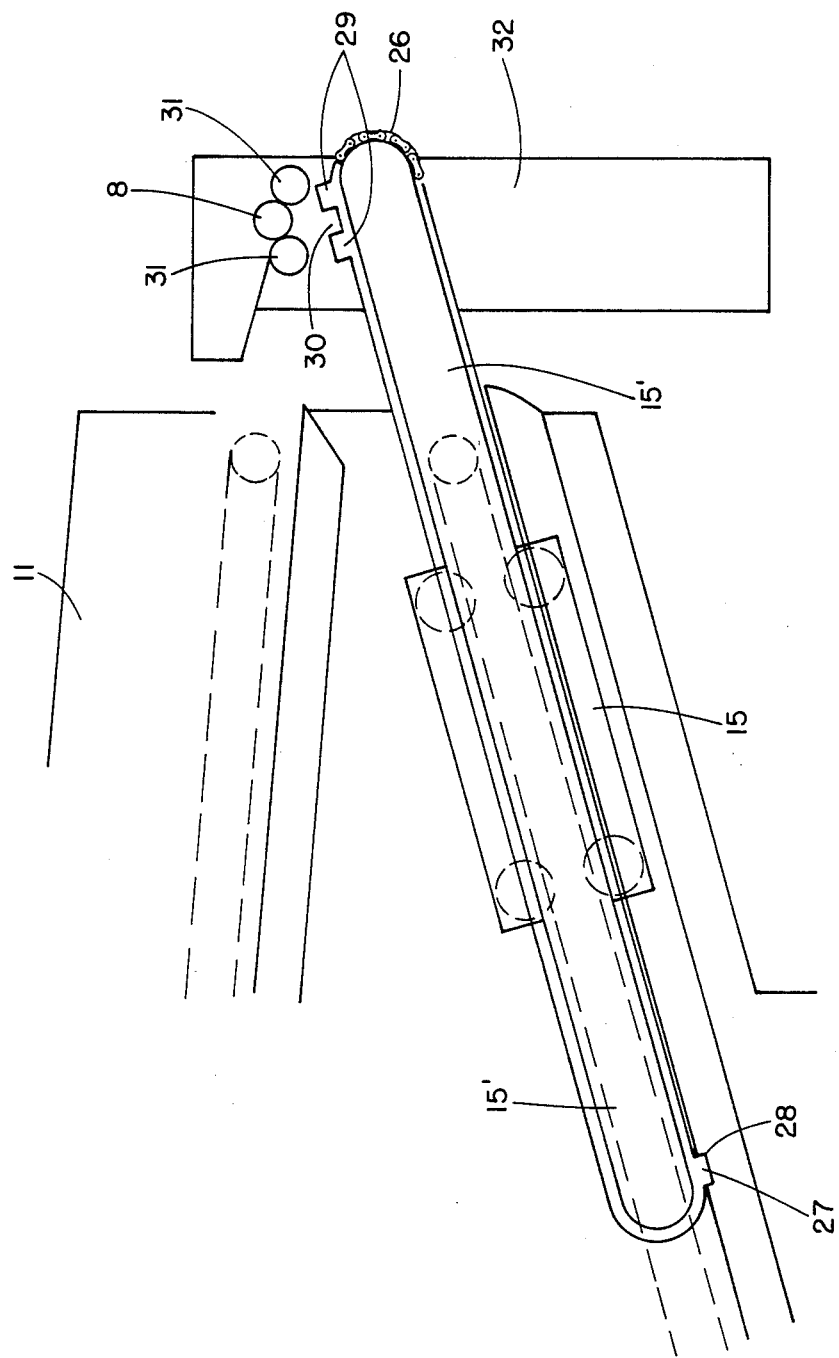
FIG. 7 illustrates, in detail, the carousel for discharging the mandrel, or piece rendering mandrel, at a position for receiving the mandrel from the turret of the piece spreading machine.

With reference to the figures of the accompanying drawings, the apparatus for automatically loading and replacing piece goods, capable of being associated with piece spreading machines, according to the present invention, comprises a vertically extending magazine or carousel 1, formed by two shoulders, at the top and bottom portions of which there are provided rotating gear wheel sets or assemblies 2, driven by a geared motor 3 through a driveshaft 4 and suitable transmission gear pairs 5.

The mentioned gear wheel sets engage with corresponding chain members 6 bearing, at even spacing, balance supporting members 7, capable of supporting the mandrel 8 in turn supporting the piece goods 9.

One one side of the mentioned carousel 1 there is located a piece loading device 10, comprising two shaped shoulders 11, on which are provided two guide pairs 12 and 12', 13 and 13' respectively, which guides are differently slanted with respect to the horizontal direction and converging toward the shoulder edge opposite to the carousel.

Along the mentioned guide pairs corresponding carriages 14 and 15 are capable of sliding driven by chain members indicated respectively at 16 and 17, which extend between end gear wheel pairs 18 and 18', 19 and 19'.

More specifically, the gear wheel pairs 18 and 19 are driven, through chain members 20 and 21, by pinion pairs 22 and 23, coupled by transmission or driving shafts which are in turn driven through respective chain members 24 by corresponding geared motor sets 25.

The mentioned carriages 14 and 15 are provided with an elongated arm member, indicated respectively at 14' and 15', along one edge of which a chain 26 is slidable. A small bracket 28, rigid with one of the guides 12 and 13, is rigidly affixed at an intermediate point 27 to chain 26.

The chain 26, in particular, bears two adjoining projecting small plates 29 which define an intermediate seat or housing 30 capable of receiving one of the ends of the mandrels 8 bearing the piece goods.

The small plates due to the coupling of the chain 26 at 27 are capable of moving, jointly to the carriages 14 and 15, from one end to the other of the carriage arm members 14' and 15'.

In this manner, the mentioned small plates 29 are capable of alternatively approaching one of the balance supporting members 7 of the carousel, and suitable supporting members 31 comprising roller pairs, one of which is controlled for moving laterally, the rollers being supported by the movable turret or slide of a known piece spreading machine.

In actual practice, after having programmed the spreading sequence of the piece goods supported by the carousel, as the apparatus is started, the mandrel of the first piece is located at the upper guides of the piece loading device, while the carriage 14 locates its arm provided with the small plates 29 in such a position so as to be capable of receiving the mandrel.

Then, after having engaged the piece, supplied by gravity, the carriage 14 is driven in such a way as to bring the small plates to the opposite end of its arm, so as to discharge the piece of the turret of the piece spreading machine.

Meanwhile, the carousel will have brought the second piece to be spread (as per program) to such a position effective to supply the piece loading service.

The carriage 14, after having discharged the first piece, returns for taking up the second piece and is driven to the intermediate position of the guides 12, 12', while the carriage 15 is driven to such a position so as to be capable of receiving, between the small plates 29 of the arm, the mandrel which is to be discharged by the turret of the piece spreading machine.

Contemporaneously, the carousel rotates to bring the balance supporting member 7 supporting the piece being spread to the guides 13 and 13'.

As the mandrel, or piece rendering mandrel, has been discharged from the turret of the piece spreading machine on the carriage 15, the latter is driven as far as to reach the related balance supporting member, while the carriage 14 supplies the second piece to be spread to the turret.

After the discharge of the first mandrel from its support, the carousel brings the subsequent piece to be spread at the guides 12, 12' in such a way to load the carriage 14 again, which, afterwards, will wait for the discharge of the second mandrel from the turret of the piece spreading machine.

Simultaneously, the carousel rotates in such a way to locate the second mandrel balance supporting member at the guides 13 and 13' and so on.

From the above disclosure and the figures of the accompanying drawings, there are self-evident the great functionality and use facility characterizing the apparatus for loading and replacing piece goods, capable of being associated with piece spreading machines, according to the present invention.

It should obviously be noted that the apparatus and its manner of operation, have been described and illustrated only by way of an example and only to demonstrate the main characteristics of the invention.

Accordingly modifications and variations may be made in the apparatus, without departing from the scope of the invention as defined in the appended claims.

I claim:

1. An apparatus for loading and replacing piece goods, capable of being associated with spreading machines, which comprises mandrels for carrying the piece goods, a vertically extending rotating carousel provided with balance supporting members for supporting said mandrels, a loading device located on one side of said carousel, said carousel including two shoulders, said shoulders bearing two motorized carriage pairs driven with synchronized reciprocating movements along respective converging paths, said carriages bearing an arm member, a chain slidable on the periphery thereof, said chain being provided with two adjoining projecting small plates for receiving therebetween either the mandrel of the pieces to be loaded on the spreading machine or the mandrel to be discharged on said carousel.

2. An apparatus according to claim 1, wherein said vertically extending rotating carousel comprises two shoulders at the top and bottom thereof are provided rotating gear wheel assemblies driven by a geared motor through a driveshaft and transmission gear pairs, said gear wheel assemblies engaging with chain members bearing, at equal distances, said balance supporting members for supporting said piece good mandrels.

3. An apparatus according to claim 2, wherein said carousel is located at an end of a loading device which comprises two shaped shoulders, two pairs of guides located thereon, said guides being differently slanted with respect to the vertical direction and converging toward the edge of said shoulders opposite to said carousel, said carriages driven by chain members slidable along said guides, said chain members extending between gear wheel pairs.

4. An apparatus according to claim 1, wherein said gear wheel assemblies comprise gear wheel pairs which are driven, through respective chain members, by pinion pairs coupled by transmission shafts, said transmission shafts being driven by means of chain members by geared motor sets.

5. An apparatus according to claim 3, wherein said carriages support an elongated arm member and a chain slidable along the periphery thereof, said chain being affixed at an intermediate point thereof to a bracket member rigid with one of said guides.

* * * * *